US011688981B2

United States Patent
Kulkarni et al.

(10) Patent No.: US 11,688,981 B2
(45) Date of Patent: Jun. 27, 2023

(54) REDRIVER TO AUTONOMOUSLY DETECT CABLE ORIENTATION

(71) Applicant: NXP B.V., Eindhoven (NL)

(72) Inventors: Abhijeet Chandrakant Kulkarni, Chandler, AZ (US); Krishnan Tiruchi Natarajan, Cuptertino, CA (US); Siamak Delshadpour, Phoenix, AZ (US); Ronald Dean Smith, Phoenix, AZ (US); Allen Yu-feng Tung, San Jose, CA (US); Hans de Kuyper, Leuven (BE); Amrita Deshpande, Chandler, AZ (US); Sivakumar Reddy Papadasu, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/293,804

(22) Filed: Mar. 6, 2019

(65) Prior Publication Data
US 2020/0287334 A1    Sep. 10, 2020

(51) Int. Cl.
*H01R 13/66* (2006.01)
*G06F 13/40* (2006.01)
*H01R 13/64* (2006.01)

(52) U.S. Cl.
CPC ..... *H01R 13/6683* (2013.01); *G06F 13/4022* (2013.01); *H01R 13/64* (2013.01); *H01R 13/6691* (2013.01)

(58) Field of Classification Search
CPC .......................... H01R 13/6683; H01R 13/64; H01R 13/6691; G06F 13/4022
See application file for complete search history.

(56) References Cited

U.S. PATENT DOCUMENTS

| 10,050,623 B2 | 8/2018 | Xiao et al. | |
| 2013/0185578 A1* | 7/2013 | Tan | G06F 1/3234 713/323 |
| 2014/0101345 A1* | 4/2014 | Ranta | G06F 11/3051 710/16 |
| 2015/0089094 A1* | 3/2015 | Wong | G06F 11/349 710/18 |
| 2015/0227489 A1 | 8/2015 | Chen et al. | |

(Continued)

FOREIGN PATENT DOCUMENTS

CN    107544934    1/2018

OTHER PUBLICATIONS

Hyperphysics.edu, Capacitor Discharge Calculator, Dec. 8, 2018, http://hyperphysics.phy-astr.gsu.edu/hbase/electric/capdis.html (Year: 2018).*

(Continued)

*Primary Examiner* — Henry Tsai
*Assistant Examiner* — Harry Z Wang

(57) ABSTRACT

A redriver includes a plurality of channels coupled to an interface, a number of detectors coupled to the plurality of channels, and a controller that determines an orientation of the interface based on states detected by the number of detectors. The controller determines that the interface is in a first orientation when a first combination of states is detected for the plurality of channels, and determines that the interface is in a second orientation when a second combination of states is detected for the plurality of channels.

19 Claims, 12 Drawing Sheets

(56) References Cited

U.S. PATENT DOCUMENTS

| | | | |
|---|---|---|---|
| 2015/0286587 A1* | 10/2015 | Ranade | G06F 11/3027 |
| | | | 710/16 |
| 2016/0110305 A1 | 4/2016 | Hundal et al. | |
| 2016/0191313 A1 | 6/2016 | Chen et al. | |
| 2017/0024350 A1* | 1/2017 | Burgers | G06F 13/4072 |
| 2017/0286360 A1* | 10/2017 | Srivastava | G06F 13/4295 |
| 2018/0027330 A1* | 1/2018 | Rand | H01R 29/00 |
| | | | 381/309 |
| 2019/0196924 A1* | 6/2019 | Gregg | G06F 11/221 |
| 2019/0286597 A1* | 9/2019 | Chiba | G06F 13/4022 |

OTHER PUBLICATIONS

"Universal Serial Bus Type-C Cable and Connector Specification", Revision 1.0, Release 1.0, Aug. 11, 2014, pp. 1-171, USB 3.0 Promotor Group, retrieved from the internet at http://www.those.ch/designtechnik/wp-content/uploads/2014/08/USB-Type-C-Specification-Release-1.0.pdf.

Samaan, S. B. et al. High-speed Serial Bus Repeater Primer—Redriver and Re-timer Micro-architecture, Properties, and Usage, Revision 1.2, Intel, 72 pgs. (Oct. 2015).

* cited by examiner

CABLE ORIENTATION STATE TABLE 222

| LANE 1 | | LANE 2 | | MODE | CABLE ORIENTATION |
|---|---|---|---|---|---|
| CHANNEL 1 | CHANNEL 2 | CHANNEL 3 | CHANNEL 4 | | |
| DETECTED | DETECTED | NOT DETECTED | NOT DETECTED | 1 | NORMAL |
| NOT DETECTED | NOT DETECTED | DETECTED | DETECTED | 1 | FLIPPED |
| DETECTED | DETECTED | NOT DETECTED | NOT DETECTED | 2 | NORMAL |
| NOT DETECTED | DETECTED | DETECTED | NOT DETECTED | 2 | NORMAL |
| NOT DETECTED | NOT DETECTED | NOT DETECTED | DETECTED | 2 | FLIPPED |
| DETECTED | DETECTED | NOT DETECTED | NOT DETECTED | 2 | FLIPPED |
| DETECTED | DETECTED | DETECTED | DETECTED | 3 | NORMAL |
| DETECTED | NOT DETECTED | DETECTED | DETECTED | 3 | NORMAL |
| DETECTED | DETECTED | DETECTED | DETECTED | 3 | FLIPPED |
| NOT DETECTED | DETECTED | DETECTED | DETECTED | 3 | FLIPPED |

REDRIVER TO AUTONOMOUSLY DETECT CABLE ORIENTATION

TECHNICAL FIELD

Example embodiments disclosed herein relate to controlling the operation of a circuit.

BACKGROUND

The integrity of signals travelling through a cable or the traces of a printed circuit board may degrade because of loss and inter-symbol interference, especially at relatively higher frequencies. A redriver may be used to solve this problem. A redriver applies equalization to compensate for channel loss and outputs signals with a high differential voltage. This may allow longer cables to be used and may promote compliance with applicable protocols and cable/connector standards.

However, a redriver may not be able to operate effectively if certain conditions arise. One of those conditions relates to the orientation of a cable connected between a host processor (or power delivery (PD) controller) and a display, smartphone, portable hard drive, keyboard, mouse, or other device. In some cases, the host processor or PD controller may not have an opportunity to inform the redriver of the orientation of a cable in a timely manner after it is plugged in. For example, there may be a finite time window within which the host processor may accept (re)flashing of its internal memory after power on. Consequently, if (re)flashing does not occur within this time window, then a malfunction may occur. The ability to rapidly detect of the orientation of a connected cable may prevent such a malfunction.

Another condition may arise during factory testing of a host platform (e.g., mobile or portable device). In this situation, a malfunction may occur if the orientation of a plugged-in cable is not detected in a timely manner, especially during a period when the internal flash of the device being tested has not yet been programmed. Without determining the cable orientation, there may be no way to configure the redriver at power-on reset (POR).

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one example embodiment, a redriver chip includes a plurality of channels coupled to an interface, a number of far end termination detectors and input signal detectors coupled to the plurality of channels, and a controller configured to determine an orientation of the interface based on states detected by the number of detectors. The controller is configured to determine that the interface is in a first orientation when a first combination of states is detected for the plurality of channels and to determine that the interface is in a second orientation when a second combination of states is detected for the plurality of channels. A first lane may include first and second channels of the plurality of channels, a second lane may include third and fourth channels of the plurality of channels, and the redriver may include at least two lanes including the first lane and the second lane.

The first combination of states may include the first channel and the second channel having a first state; and the third channel and the fourth channel having a second state. The second combination of states may include the first channel and the second channel having the second state; and the third channel and the fourth channel having the first state. The first combination of states may include the first channel having a first state and the second, third, and fourth channels having a second state after a timer period has expired, or the second channel having the first state and the first, third, and fourth channels having the second state after the timer period has expired.

The second combination of states may include the third channel having the first state and the first, second, and fourth channels having the second state after the timer period has expired; the fourth channel having the first state and the first, second, and third channels having the second state after the timer period has expired. The first combination of states may include the first, second, and third channels in a first state and the fourth channel in a second state, or the first, second, and fourth channels in the first state and the third channel in the second state. The second combination of states may include the first, third, and fourth channels in the first state and the second channel in the second state, or the second, third, and fourth channels in the first state and the first channel in the second state.

The controller may output a stimulus and the number of detectors is to detect the states in response to the stimulus. The number of detectors may detect the states in response to an externally applied stimulus. The number of detectors may detect the states in response to low frequency periodic signals (LFPS) or Loss of high frequency Signal (LoS) signals. The second orientation of the interface may be a flipped version of the first orientation of the interface. The controller may output at least one control signal to disable one or more of the number of channels not in use for the first orientation or the second orientation. The controller may output a notification signal to a processor or controller of a host, the notification signal indicating that the interface is in the first orientation or the second orientation. Each of the first and second combinations of states may include a first state and a second state, the first state may correspond to detection of a terminal resistor, and the second state correspond to when a terminal resistor is not detected. The interface may be a USB-C cable.

In accordance with another example embodiment, a method includes detecting states of a plurality of channels corresponding to an interface between a host system and a device, determining that the interface has a first orientation when a first combination of states is detected for the plurality channels, and determining that the interface has a second orientation when a second combination of states is detected for the plurality of channels, wherein the second orientation of the interface is a flipped version of the first orientation of the interface. Each of the first combination of states and the second combination of states may include a first state and a second state, the first state may correspond to detection of a terminal resistor, and the second state may correspond to when a terminal resistor is not detected.

In accordance with another example embodiment, an apparatus includes a logic function or state table storing information relating to a first combination of channel states to a first orientation of an interface coupled between a host system and a device and a second combination of channel states to a second orientation of the interface coupled between the host system and the device; and a controller to determine that the interface is in the first orientation when the first combination of channel states is detected and to determine that the interface is in the second orientation when the second combination of channel state is detected, the second orientation of the interface being a flipped version of the first orientation of the interface. The controller may output a notification signal to a processor or controller of the host system or to the device indicating that the interface is in the first or second orientation.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

FIG. 4 illustrates an example of a state table for determining orientation of the interface;

DETAILED DESCRIPTION

Figure 1:
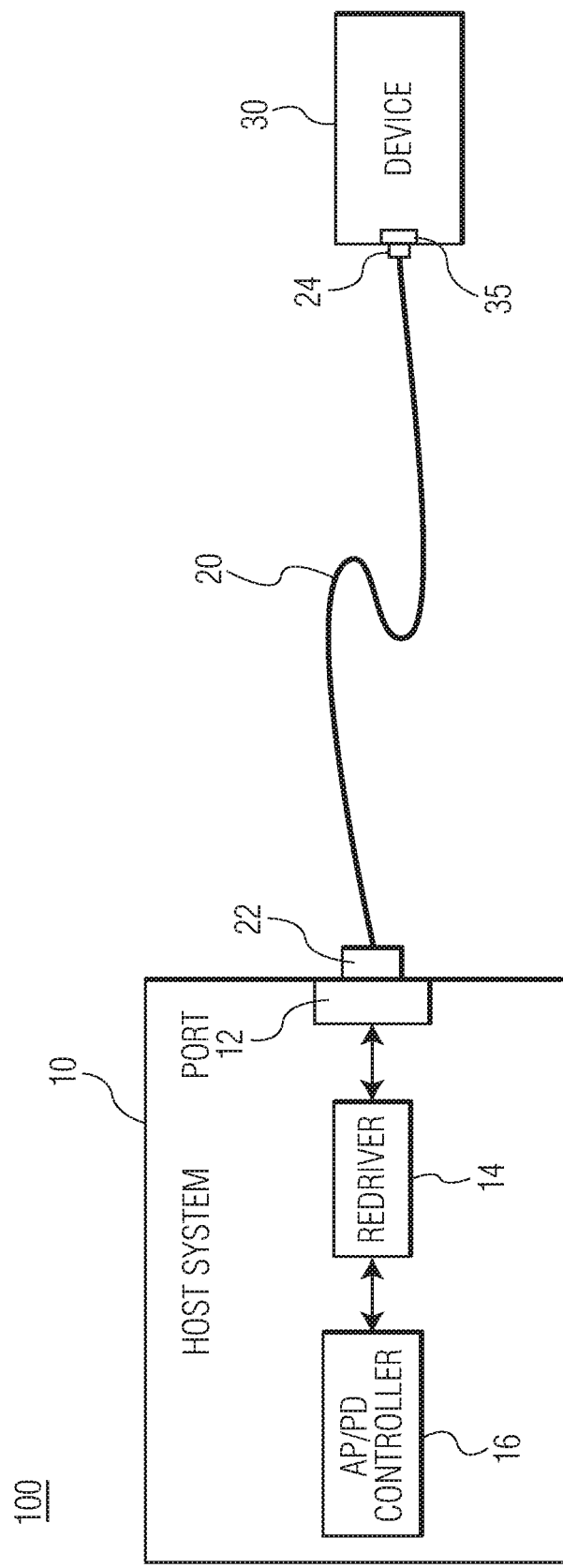
FIG. 1 illustrates an embodiment of system including a redriver.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates an embodiment of a system 100 which includes a host system 10 coupled to a device 30 by an interface 20. The host system 10 includes a port 12, a redriver 14, and a controller 16. The port may be a type compatible with a connector on at least one end of the interface 20. The redriver 14 may perform various operations including applying equalization to compensate channel loss for purposes of outputting signals with a higher or predetermined differential voltage. The controller 16 may be an application processor (AP), a power delivery (PD) controller, a central processing unit, or another type of logic for managing operations in the host system.

The interface 20 includes a plurality of internal signal lines for carrying signals between the host system 10 and the device 30. The signals may be data signals, control signals, or power signals, or a combination thereof. In one embodiment, the interface may have ends with different types of connectors 22 and 24 that are compatible with the port 12 in the host system 10 and a port 35 in the device 30. In another embodiment, the connectors 22 and 24 on the ends of the interface 20 may be the same type. Examples of these connectors include Universal Serial Bus (USB) 3.0 or USB-Type C (USB-C) connectors, Thunderbolt, Lightening, Display Port, and FireWire, and peripheral component interconnect express (PCIe), as well as others.

The signal lines of interface 20 match the pin configurations and protocols of the connectors and ports. In one embodiment, the interface and/or its connectors may include a conversion circuit when the ports 22 and 24 correspond to different protocols or standards. In one embodiment, both connectors may be removably coupled to the ports of the host system 10 and the device 30. In another embodiment, one of the connectors may be fixed to a corresponding one of the ports. Also, the interface 20 is illustrated as a cable in FIG. 1. In another embodiment, the interface may include one or more traces or signal lines on a printed circuit board or another type of interface for carrying signals between the host system and device.

The device 30 may be any one of a variety of types of electronic devices, including but not limited to computers, servers, smartphones, cameras, media players, media consoles, televisions, displays, cable boxes, audio systems, storage devices, or other types of electronic devices. In one embodiment, the host system 10 may also be selected from these types of electronic devices or may be a different type of device. In one embodiment, device 30 may also include a redriver or other circuit to perform equalization and boost signal gain.

Figure 2A:
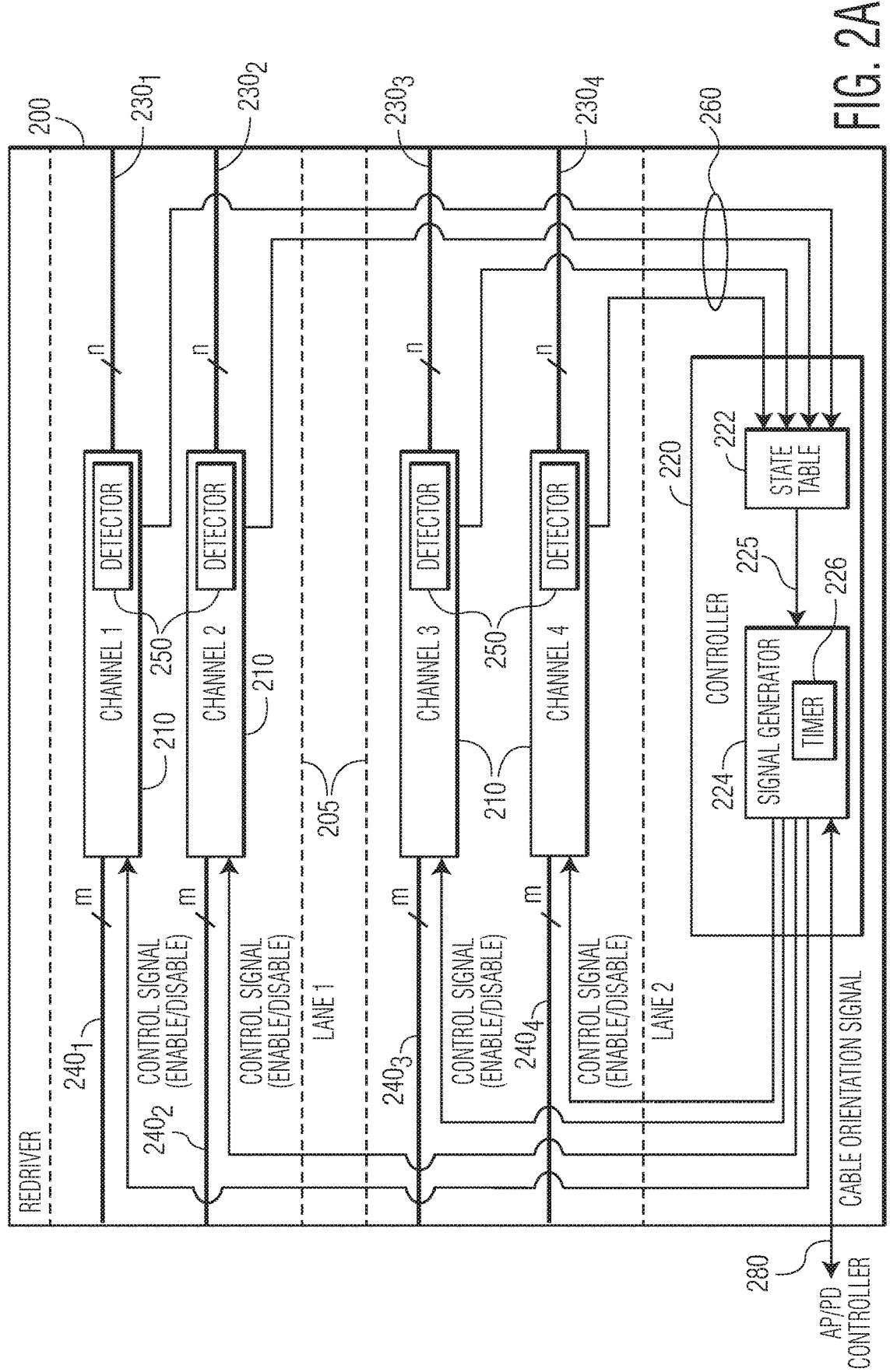
FIG. 2A illustrates an embodiment of the redriver coupled to an interface.

FIG. 2A illustrates an embodiment of a redriver 200 which may correspond to redriver 14 in FIG. 1. As shown in FIG. 2A, the redriver 200 includes a plurality of lanes 205 arranged to carry signals between the controller 16 and port 22 of the host system. Each lane includes one or more channels 210 coupled to controller 220. The channels in each lane may be unidirectional or bidirectional, or both. For example, a unidirectional channel may carry signals from the host system to a display corresponding to device 30, but not in the reverse direction. A bidirectional channel may carry signals in both directions between host system 10 and device 30. In this embodiment, the redriver 200 includes two lanes and four channels. In another embodiment, the redriver may include a different number of lanes and/or channels, for example, as determined by the communication protocol (e.g., USB-C, Thunderbolt, Lightning Bolt, FireWire, etc.) of the interface and its connectors.

Each channel is coupled between one or more input lines $230_{1, 2 \ldots N}$ and one or more output lines $240_{1, 2 \ldots N}$. In one embodiment, each channel is coupled between N input lines and M output lines, where each of N and M are greater than or equal to one. The input lines and output lines may themselves be single lines or may be arranged as respective pairs of lines carrying differential voltage values (e.g., positive and negative). In this case, it is the voltage difference between the pair of lines that corresponds to the data, control, or power signals carried by the redriver. When the redriver is incorporated within an integrated circuit chip, the input and output lines may correspond to respective traces, pins, or ports of the chip.

The controller 220 includes a state table 222 and a signal generator 224.

The state table 222 stores information for autonomously determining the orientation of interface 20 when connected to the port 12 of the host system. In one embodiment, the information may associate a number of orientations of the interface with a number of states of the channels 210 for one or more operational modes of the redriver and/or the host system. The operational modes may include, for example, power-on or start-up mode, reset mode, factory testing mode, and/or another mode of operation.

Figure 2B:
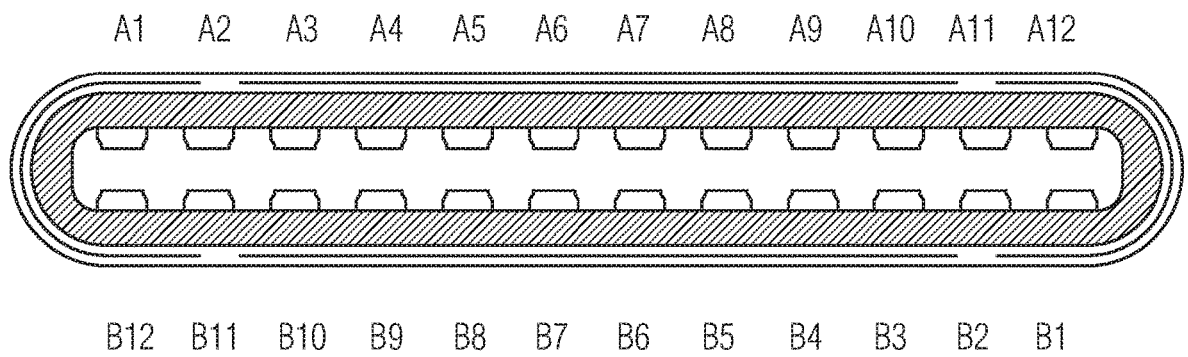
FIG. 2B illustrates a first orientation of the interface.
Figure 2C:
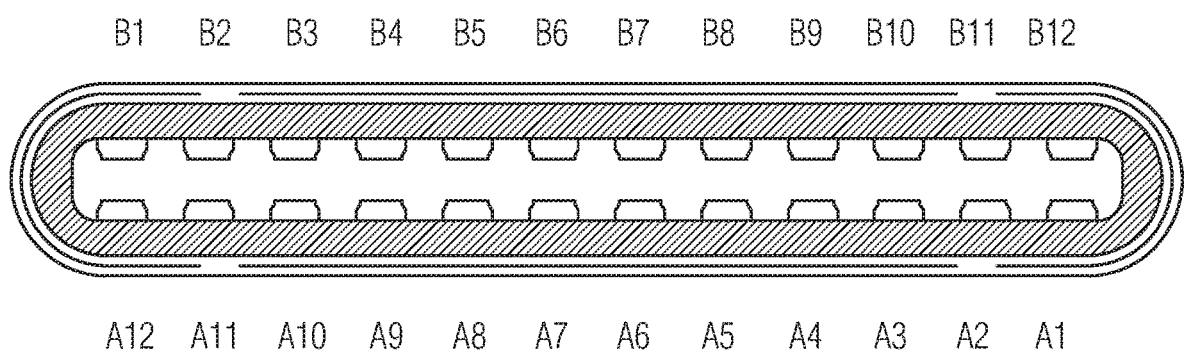
FIG. 2C illustrates a second orientation of the interface.

Considering the case where the interface 20 is a cable, the orientations may include a first orientation (where connector 22 is inserted into port 12 of the host system in what is considered to be a normal orientation, as illustrated in FIG. 2B) and a second orientation (where connector 22 is inserted into port 12 in what is considered to be a flipped orientation, as shown in FIG. 2C). The states of the channels 210 may be determined, for example, by detectors 250 coupled to the signal path(s) in respective ones of the channels. The detectors 250 may input signals indicative of the states (e.g., voltage levels, signal patterns, etc.) of their respective channels into the controller 220 through lines 260. As discussed in greater detail below, in one embodiment, the states of the channels may indicate the presence or absence of one or more termination resistors in the device connected to the host system (redriver) through the interface 20. The controller 220 compares the states of the channels to the orientation information in the state table 222. Based on this comparison, the state table outputs a signal 225 indicative of the orientation of the cable. The comparison may be performed, for example, by firmware, a state machine, VMware, or another type of modeling or control software.

In another embodiment, controller 220 may include a detector to detect the states of the channels. In this case, the channels themselves may not include detectors 250. Instead, the channel signals may be input into the detector of the control logic, and this detector may output the states of the channels to state table 222 based on the detected signals. In either case (e.g., whether detectors in the channels or a detector is in the control logic), the redriver 200 may be considered to have at least one detector for detecting the states of the channels. An example of a state table will be discussed in greater detail below.

The signal generator 224 generates a number of signals based on the orientation of the cable indicated by the state table. For example, the signal generator may generate enable and/or disable signals based on the cable orientation. When enable signals are generated, the enable signals are input into selected ones of the channels to maintain or change operation of the channel for purposes of carrying information between the port and controller of the host system. For example, after the controller determines the orientation of the cable, the controller may enable selected ones of the channels (and its associated circuits) for an anticipated subsequent mode of operation (e.g., normal mode, high-speed data mode, etc.) of the host system 10, the interface 20, and/or the device 30. In one embodiment, the enable signals may not be output from the controller but rather channels corresponding to the determined orientation may be left in an operational or powered state.

When disable signals are generated, the disable signals may be output on lines output from the signal generator 224 to change the operational state of selected ones of the channels based on the determined orientation. This may involve, for example, changing the channel (and its attendant circuits) to a low-power state or a turned-off state. The disable signals may therefore prevent power from being unnecessarily consumed for circuits that are not to be used given the connected orientation of the cable. This may be especially beneficial when the host system or device is operating in battery mode. In one embodiment, the controller may only output the disable signals to selected ones of the channels (e.g., the channels corresponding to a lane which is not to be used given the determined cable orientation) and the other lane(s) may be left in an operative state.

The signal generator 224 may also output a signal 280 to inform the controller 16 of the host system 10 of the determined orientation of the cable. The controller 16 may then reconfigure one or more of the host system circuits (e.g., multiplexers, etc.) to operate based on the cable orientation. The cable orientation signal 280 is especially beneficial in cases where the host system 10 (or PD controller) is unable to inform the redriver 200 of the cable orientation in a timely manner after the cable is plugged in. For example, there may be a finite time window within which the host processor may accept (re)flashing of its internal memory after power on, reset, start-up, or another mode. Consequently, if (re)flashing does not occur within this time window, then a malfunction may occur. In accordance with one or more embodiments, the cable orientation signal output from controller 220 may prevent such a malfunction.

In one embodiment, the redriver 200 may always determine cable orientation at power-on, start-up, or reset and then inform the host system. Additionally, or alternatively, the controller 220 of the redriver may determine cable orientation and/or otherwise control the state of the channels (e.g., active, low-power, disabled/turn-off, etc.) in response to a control signal from the controller 16 of the host processor. This situation may apply, for example, when the aforementioned malfunction occurs or when controller 16 otherwise determines that it is unable to detect cable orientation after a sufficient time has passed.

In one embodiment, the redriver 200 may determine cable orientation when a configuration signal indicative of cable orientation is not received from the controller 16 of the host system. Such a configuration signal may inform the redriver of the cable orientation, for example, based on internal software or other signals from the device received through the channels or other signal lines. If the controller 220 determines that a predetermined time has passed after power-on, entry into another mode, or another condition, then the controller 220 of the redriver may detect the cable orientation and, then, send the cable orientation signal to the controller 16 of the host system.

In another embodiment, the redriver 200 may determine cable orientation during factory testing of, for example, a host platform or device (e.g., a mobile, portable, or other platform). If the orientation of a plugged-in cable is not detected in a timely manner, a malfunction may occur, especially during a period when the internal flash of the system or device being tested has not yet been programmed. Without determining the cable orientation, there may be no way to configure the redriver at power-on reset (POR). To prevent such a malfunction, controller 220 may receive a signal indicating that the redriver should determine the orientation of the cable. This signal may be received from the host system 10, the device 30, or testing equipment.

Figure 3A:
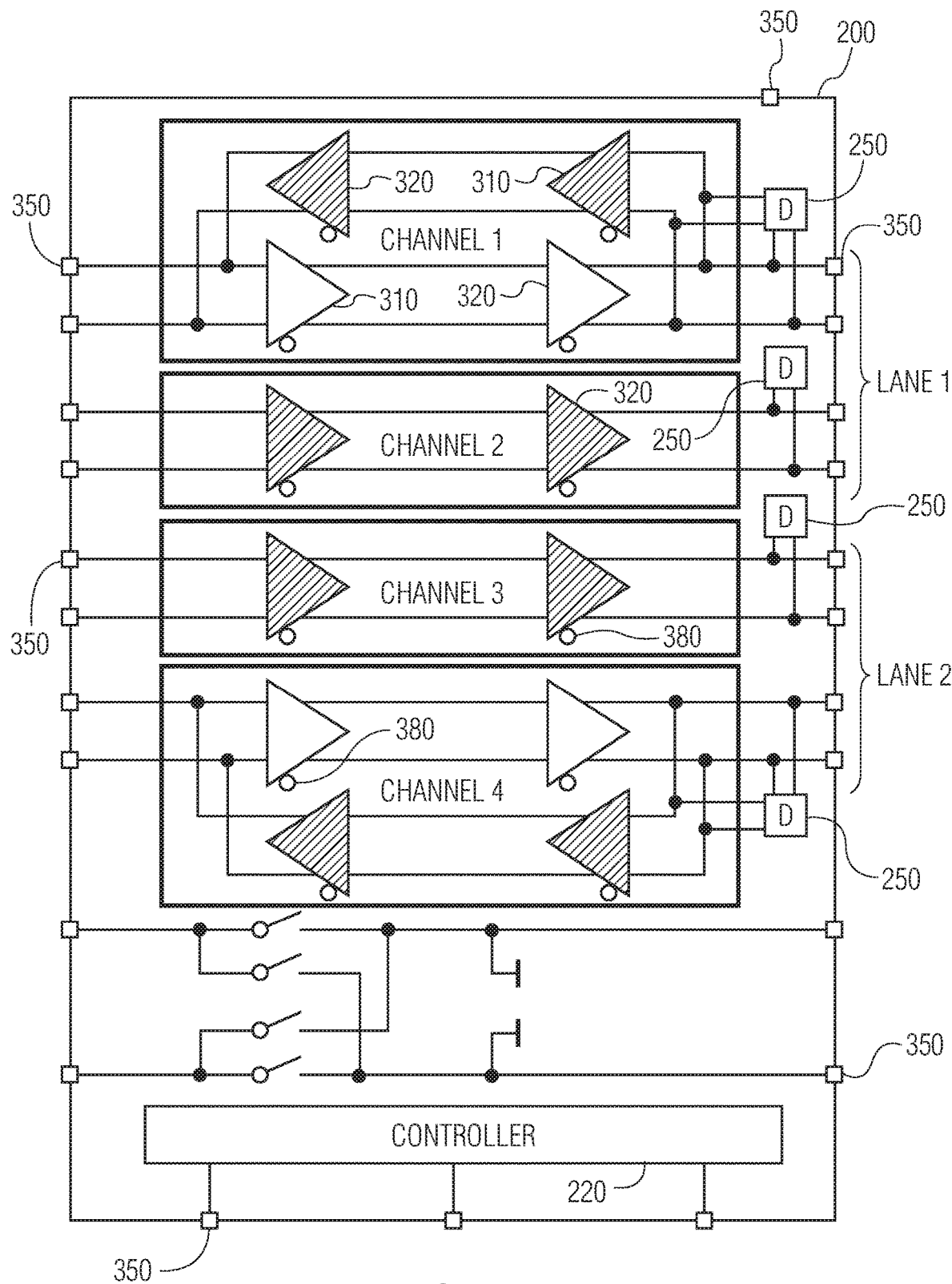
FIG. 3A illustrates another embodiment of the redriver.

FIG. 3A illustrates an embodiment of the redriver 200 incorporated into an integrated circuit chip. In this embodiment, the lanes are coupled between differential input and output lines 230 and 240 corresponding to some of the pins 350 of the chip. The pin configuration and its association with the channels, controller 220, and other features of the redriver may be determined, for example, based on the specific type and/or communication protocol of the cable. For example, the pin configuration and signal lines for a USB-C cable may be different from the pin configuration and signal lines for a FireWire, Thunderbolt, PCIe, Display Port, or other type of cable.

Referring to FIG. 3A, Lane 1 includes bidirectional Channel 1 and unidirectional Channel 2, and Lane 2 includes a unidirectional Channel 3 and a bidirectional Channel 4. In the unidirectional channels. The unidirectional channels include a single pair of differential circuits connected in series and coupled between the input and output lines. The differential circuits may include, for example, a receiver 310 and a transmitter 320. In one embodiment, the receiver 310 may perform an equalization operation to shape the incoming differential signal to conform to an applicable standard or protocol, and the transmitter may apply a gain to the signal output from the receiver 310. The equalization and gain may be fixed or may be values programmed or otherwise controlled by the controller 220 of the redriver, for example, based on operational mode. The equalization and gain may compensate for distortion and losses experienced by the signals traveling through the cable. In FIG. 3A, only two lanes are shown. In another embodiment, the redriver 200 may include more than two lanes, each having a structure similar to or different from Lanes 1 and 2.

The bidirectional channels include a first pair of differential circuits coupled in parallel to a second pair of differential circuits between the same input and output lines (and pins) of the redriver. However, only one pair of the differential circuits is enabled (see circuits that have shading). The other pair of differential circuits in each bidirectional channel are disabled (see unshaded circuits). The differential circuits may be enabled or disabled based on signals received from controller 220 through enable/disable inputs 380. Thus, in each lane, the enabled pair of differential circuits in the bidirectional channel (Channel 1/Channel 4) and the unidirectional channel (Channel 2/Channel 3) carry signals in opposing directions. In this embodiment, the channels include detectors 250, but a single detector may be included in the controller 220 in relation to an alternative embodiment as previously described. Also, as previously described, the controller 220 may output signals to the channel circuits to selectively enable and disable the channel circuits. The controller 220 may also output the cable orientation signal 280 through one of the pins 350 and receive signals from controller 16 of the host system and/or device 30 through other ones of the pins 350.

The redriver circuit 200 may be implemented in various ways to determine the orientation of interface 20, which for the balance of this application will illustratively be referred to as a cable. In a first implementation, the redriver 200 operates as a signal source and a signal measuring device. In the second implementation, the redriver 200 operates as operates as a signal measuring device for measuring signals that have been externally generated.

First Implementation

The redriver 200 may operate as a signal source and a signal measuring device in the first implementation. When operating as a signal source, the controller 220 generates and outputs a stimulus (e.g., 285 in FIG. 2A) through one or more predetermined pins. The stimulus travels through the cable to the connected device 30, which includes termination resistors corresponding to the lanes. The termination resistors are used to match impedance with the cable in order to prevent signal reflections that could adversely affect performance. The stimulus applied by the controller 220 may take various forms. For example, the stimulus may be an applied current, a specific type of waveform (e.g., low level sine wave), or another signal or signal pattern associated with a predetermined transfer function. The stimulus may be applied on the data lines/pins or another pin/line corresponding to the interface and device.

The termination resistors are coupled to respective capacitors, which, in turn, control the line voltage state of corresponding ones of the channels. Operating as a signal source, the controller 220 of the redriver applies a current (or other stimulus) to one or more pins which are connected to device 30 through the cable. In one embodiment, through one or more pins which correspond to the signal lines 230 of the channels or the stimulus may be applied through one or more pins different from the channel signal lines (e.g., 230 in FIG. 2A). In this latter case, the stimulus may trigger a signal response on the channel lines, which may provide a basis for determining the states of the channels.

The detectors 210 in the redriver are used to detect the presence or absence of termination resistors for the channels. If device 30 is connected through the cable, the detectors will detect the termination resistors for one lane. If device 30 is not connected through the cable, the detectors 210 will not detect termination resistors for any of the lanes. If the detectors 210 detect termination resistors for two or more lanes, then additional information may be needed to resolve this apparent discrepancy.

Figure 3B:
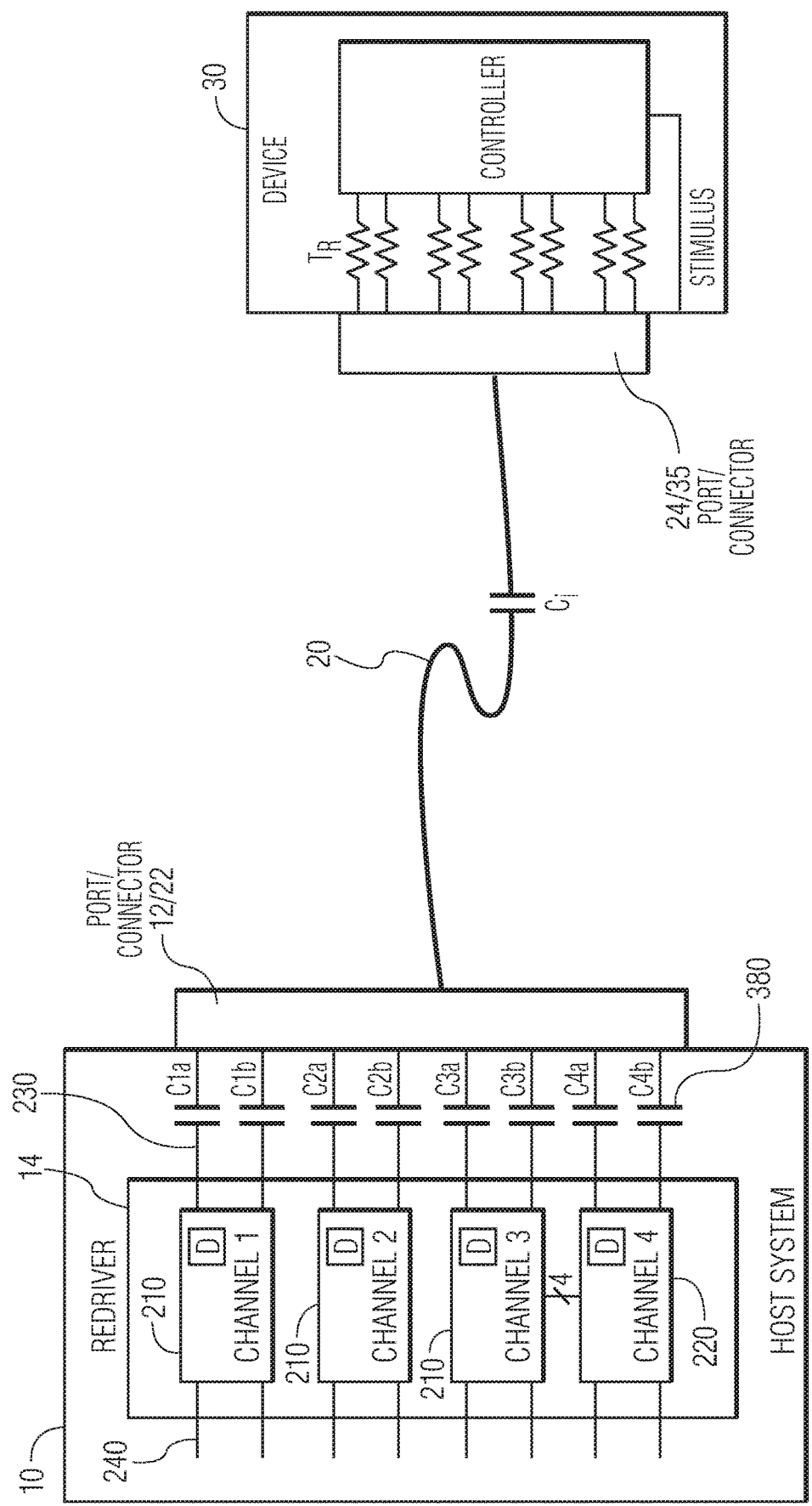
FIG. 3B illustrates an example of channel and cable capacitances and termination resistors.

The presence or absence of termination resistors in any given lane will affect the charge state of the capacitors (and the line voltage) of the channels in that lane. For example, if termination resistors are not detected for any lane, then it may be assumed that cable 20 is not connected to port 12 or cable 20 is connected but the device 30 is not connected to the other end of the cable or is not yet in a communicative state. When no termination resistors are detected, then the applied stimulus charges corresponding channel capacitors and the cable capacitance at a relatively high rate. An example of the channel capacitors 380, cable capacitance $C_i$, and termination resistors $T_R$ are illustrated in FIG. 3B. The detectors in the channels may output the line voltages for respective ones of the channels and/or the charge states of the capacitors to the controller 220 to determine the charge rate, and thus the connection state of the interface 20.

If termination resistors are detected for at least one channel in a lane, then the termination resistors produce a voltage divider effect with an associated RC time constant. The voltage divider effect causes the channel capacitors to charge at a relatively low rate. By measuring that the charge rate of the capacitors for at least one lane is different from the charge rate of the capacitors in the other lane(s) after the stimulus is applied, the controller 220 may determine that device 30 has been connected to the host system 10 through the cable.

When termination resistors are detected for one or more lanes (and thus the device is determined to be connected), the redriver 200 may operate as a signal measuring device to determine the orientation of the cable. When termination resistors are detected for at least one channel of at least one lane, the presence of the termination resistor(s) will produce a corresponding change in the voltage state of one or more signal lines (e.g., 230 in FIG. 2A) of the channel(s). The orientation of the cable may be determined based on predetermined combinations of channel states. An example of a state table 222 relating these combinations to different orientations will be discussed in greater detail below.

Second Implementation

The redriver 200 may operate as a signal measuring device for measuring signals produced by a stimulus that is externally generated in the second implementation. In this case, the stimulus may be generated by the host system or the device, instead of the redriver, and the resulting states of the channels are detected as a way of determining cable orientation. In one embodiment, the states may correspond to low frequency periodic signaling (LFPS), high frequency signal loss (LoS), or high-speed or high-frequency signaling occurring on one or more lanes of the redriver chip. The stimulus may be any stimuli type mentioned with respect to the first implementation.

FIG. 4 illustrates an example of a state table 222 that may be used to determine the orientation of the cable based on the detected states of the channels. In this example, the state of each channel corresponds to whether a termination resistor is detected for that channel according to any of the signal measuring implementations of the redriver previously discussed. If a far-end termination resistor is detected for a channel, the state table will include a DETECTED designation. If a far-end termination resistor is not detected for a channel, the state table will include a NOT DETECTED designation. (The states may be thought of as corresponding to the presence or absence of a channel signal (or a specific type of channel signal) in some embodiments).

In the state table 222, the controller may receive a signal through one or more pins to determine the mode of operation that exists for the host system. The modes may include power-up in any mode, power-up in a specific mode (e.g., USB3), reset mode, a low-power or deep power saving mode (e.g., U0, U1, etc.), a normal power mode, a high-speed mode, a high-frequency mode, a compliance mode (e.g., compliance with a protocol or standard), a non-compliance mode, factory testing mode, or another mode of operation of the host system and/or the connected device. In one embodiment, the mode may be determined based on a signal received through one or more pins of the redriver, e.g., a NVM/OTP bit or external pin. For a USB application, the redriver may power up in a USB3 mode.

The state table 222 illustrates channel states for three modes, but the channel may include a different number of modes in another embodiment. The state table 222 also shows the cable orientation corresponding to the channel states in the different modes. The cable orientation may, for example, be programmed into the state table by a system designer or may be dynamically determined in accordance with the logic of the controller 220. In another embodiment, the state table 222 may include states and associated modes and cable orientations for one or more additional lanes. The information in the state table 222 is provided with the assumption that device 30 is connected to the host system 10 through the interface 20.

The state table 222 may be described with reference to FIGS. 5, 6, and 7.

Figure 5A:
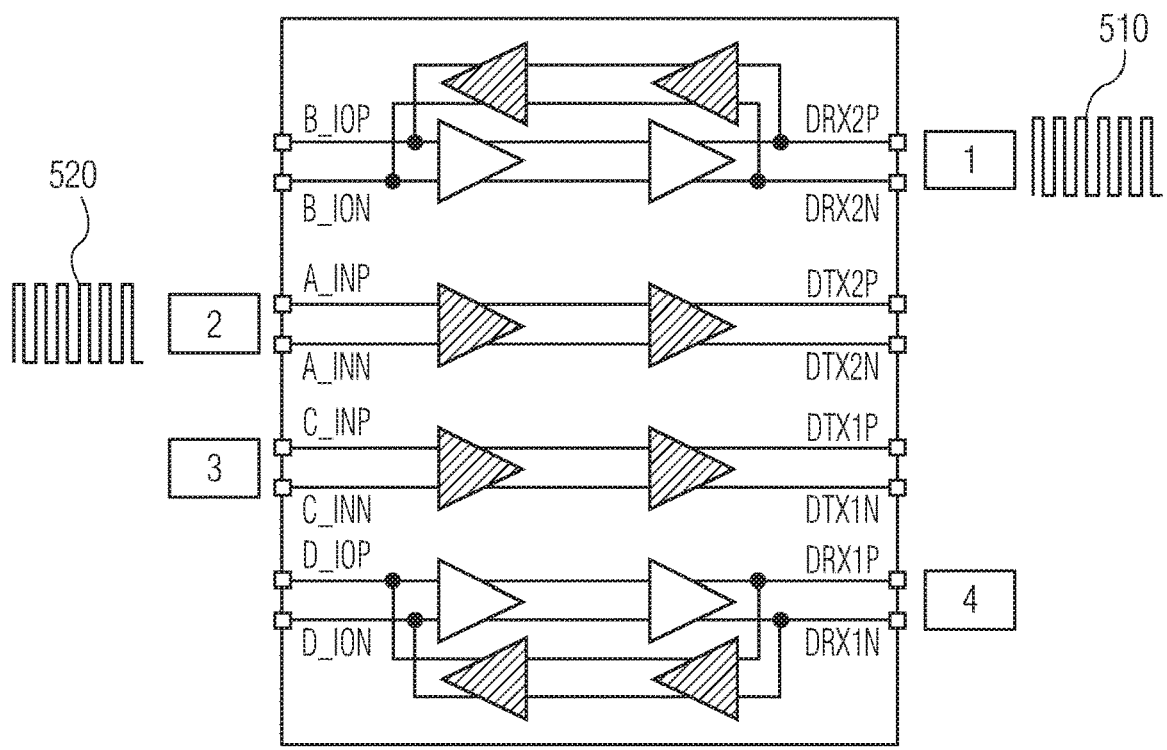
FIGS. 5A and 5B illustrate examples of channel signals for different interface orientations.

In Mode 1, the state table indicates that the cable is in normal orientation when termination resistors are detected on Channels 1 and 2 of Lane 1 and no termination resistors are detected on Channels 3 and 4 of Lane 2, as illustrated in FIG. 5A. The detection of a terminal resistor may correspond to the detection of a predetermined line voltage or other signal on the differential signals lines of a corresponding channel. In the case of FIG. 5A, line voltages (or signals) 510 and 520 indicative of the presence of termination resistors are detected or Channels 1 and 2 of Lane 1 and no such line voltages are detected on Channels 3 and 4 of Lane 2.

Figure 5B:
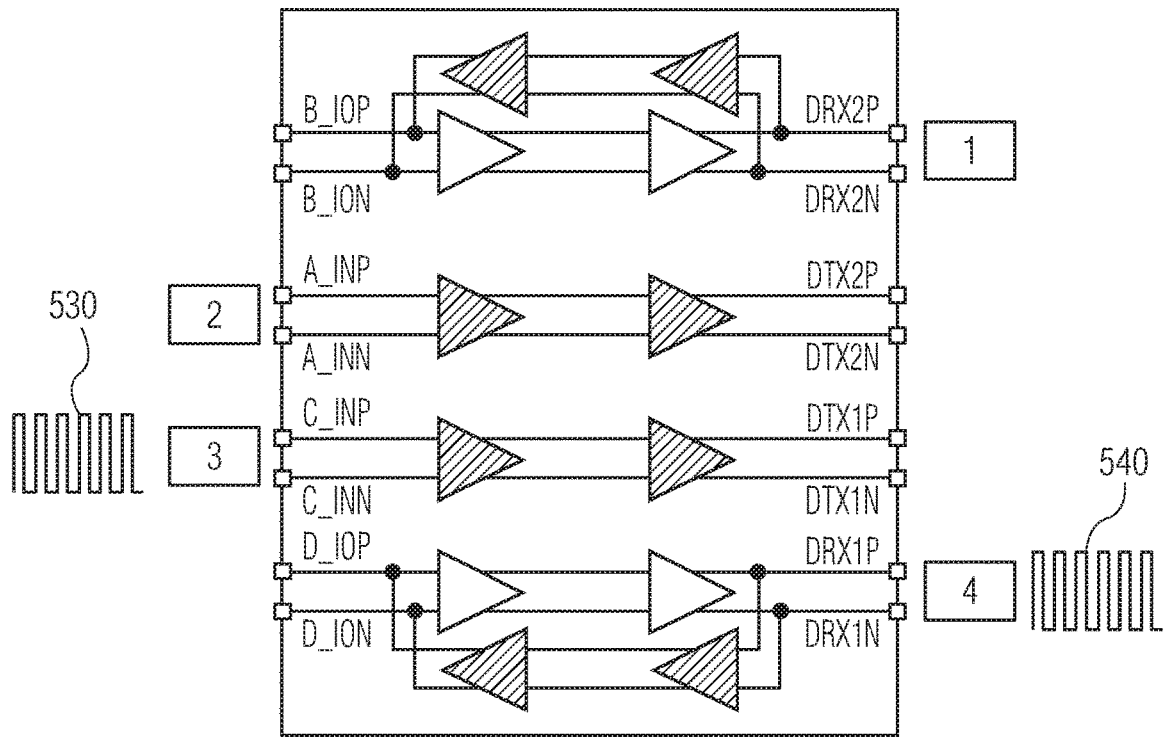

The state table indicates that the cable is in flipped orientation when line voltages 530 and 540 (termination resistors) are detected on Channels 3 and 4 of Lane 2 and no line voltages (no termination resistors) are detected on Channels 1 and 2 of Lane 1, as illustrated in FIG. 5B. In either case, the signals on both channels are carried in opposing directions and may be, for example, handshaking signals indicative of LFPS or LoS activity. Mode 1 may be any of the modes previously described, but in this example may be a USB-UO mode.

Figure 6A:
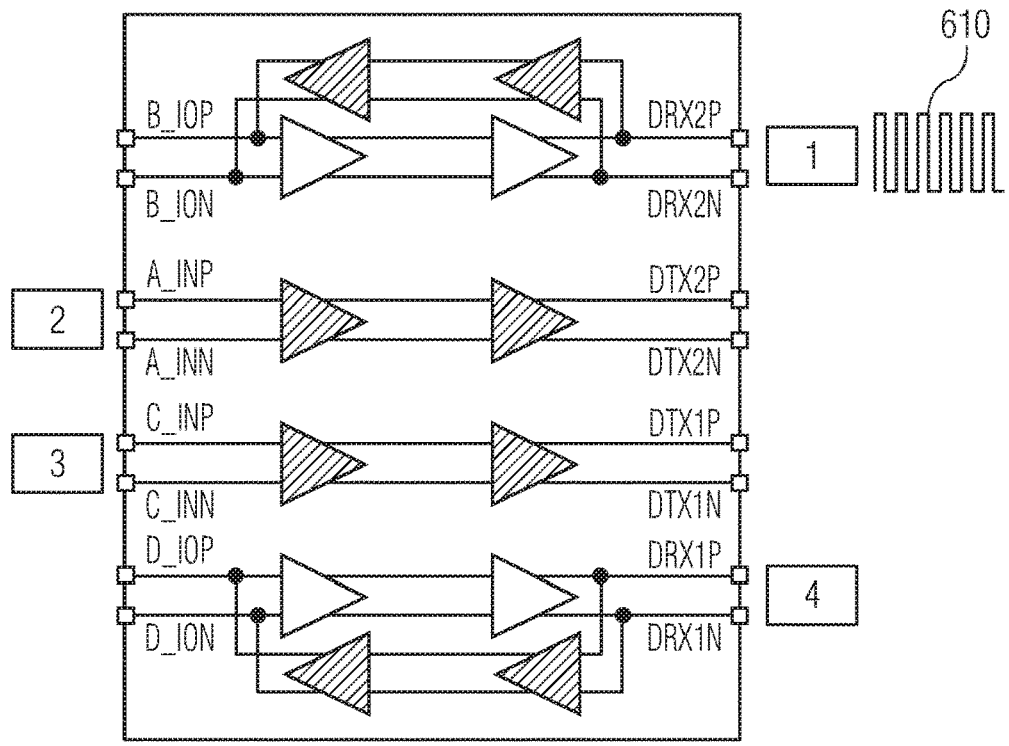
FIGS. 6A-6D illustrate examples of channel signals for different interface orientations.
Figure 6B:
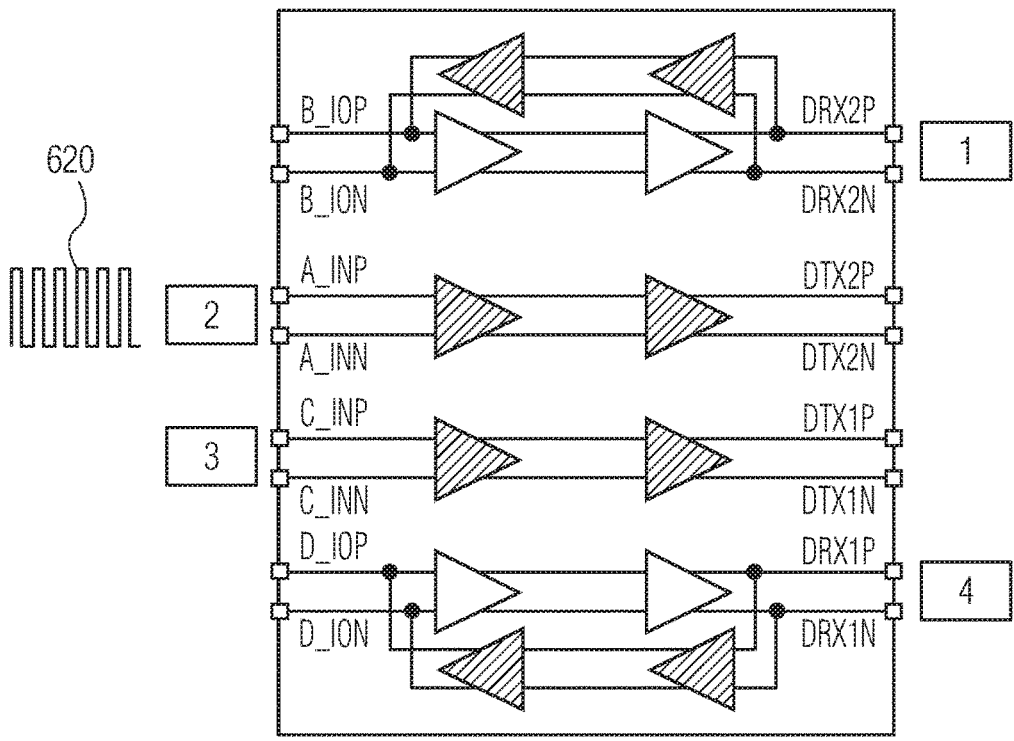
Figure 6C:
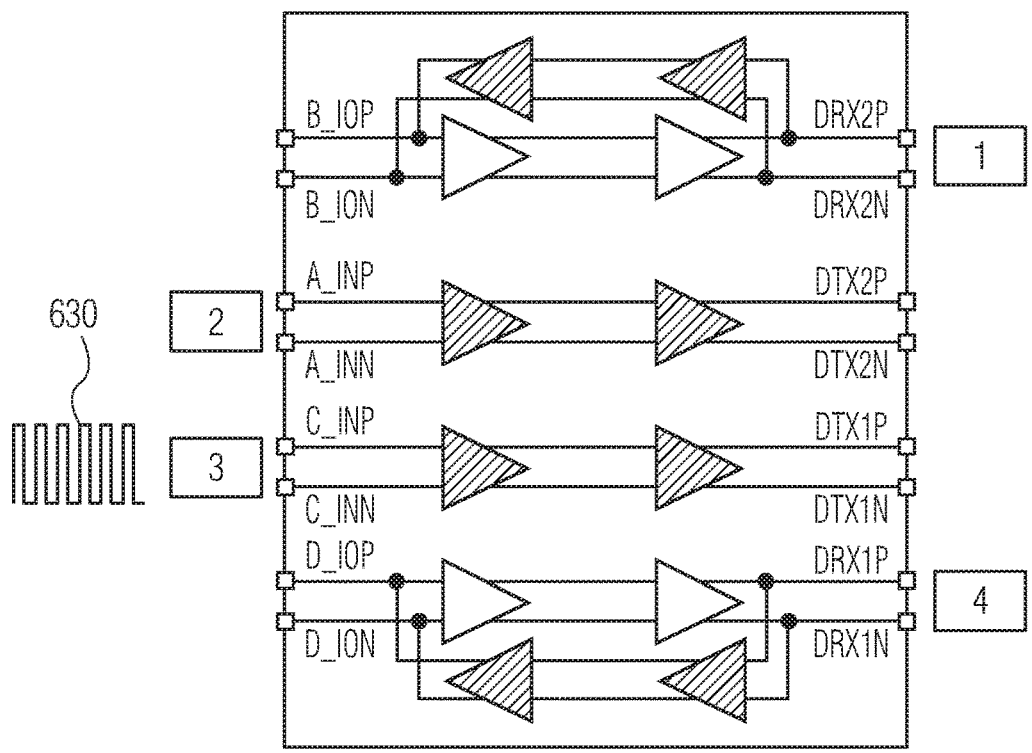
Figure 6D:
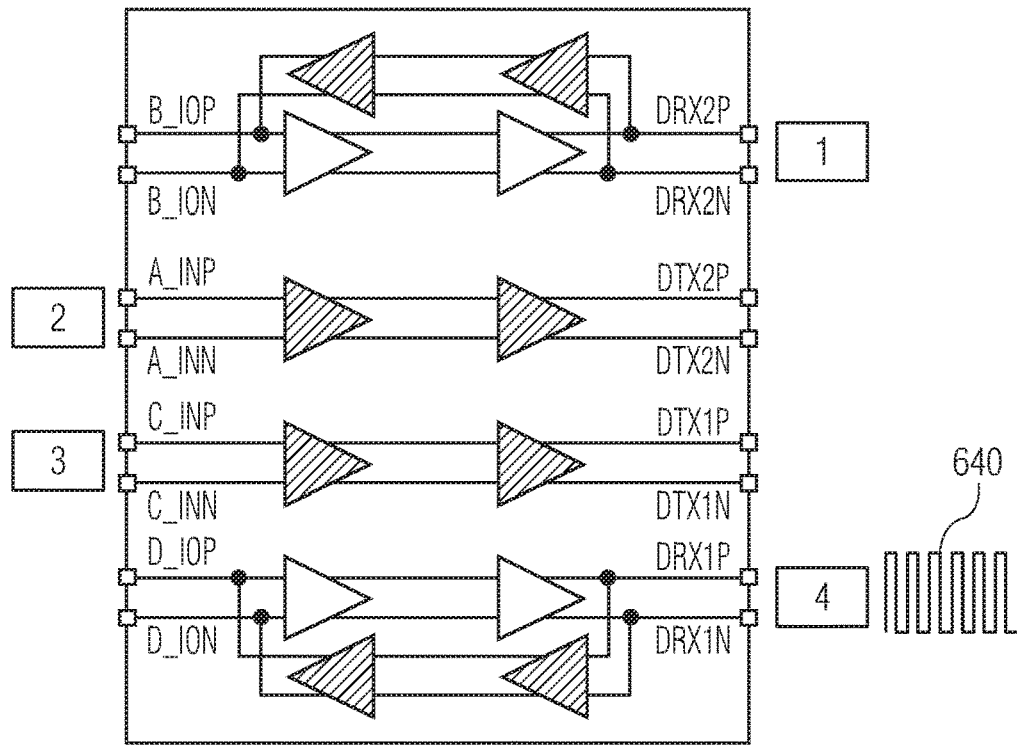
Figure 7A:
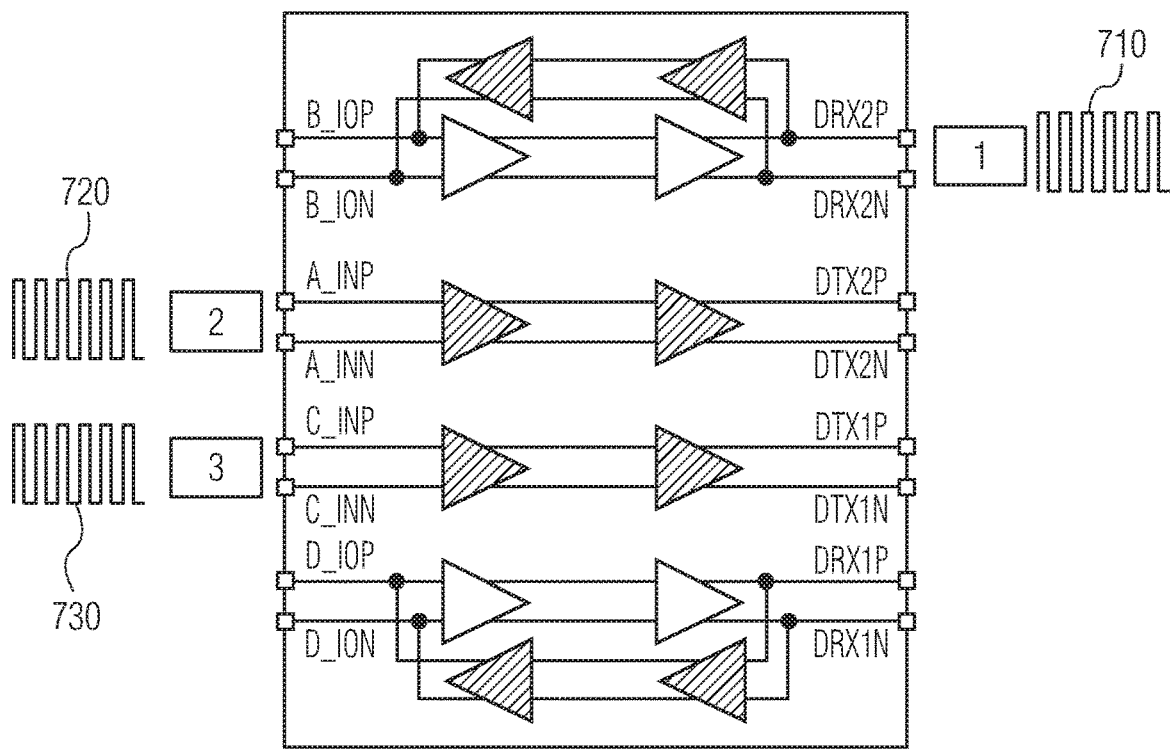
FIGS. 7A-7D illustrate examples of channel signals for different interface orientations.
Figure 7B:
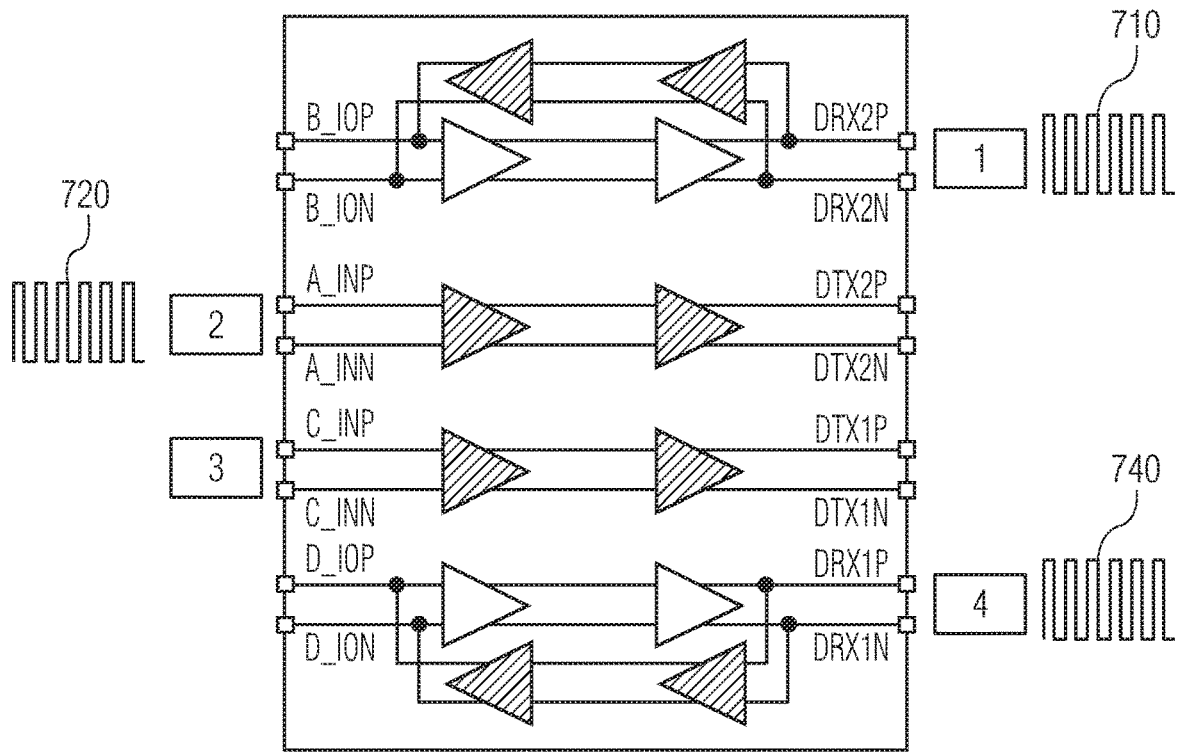
Figure 7C:
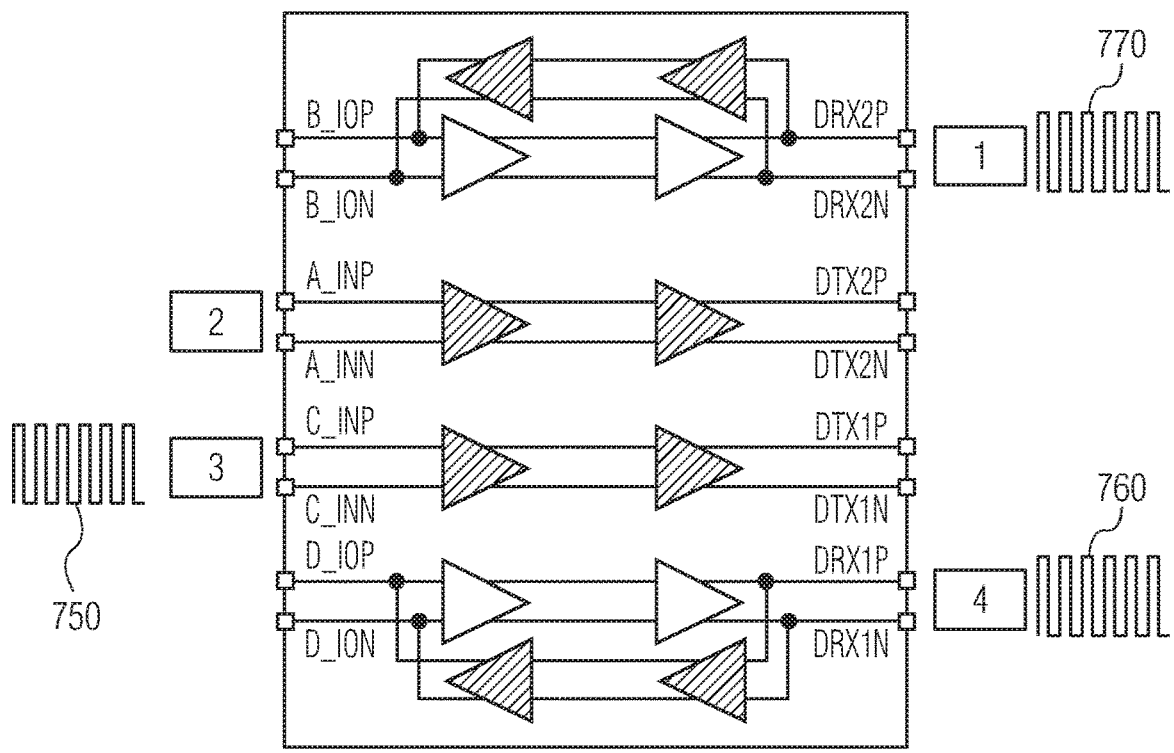
Figure 7D:
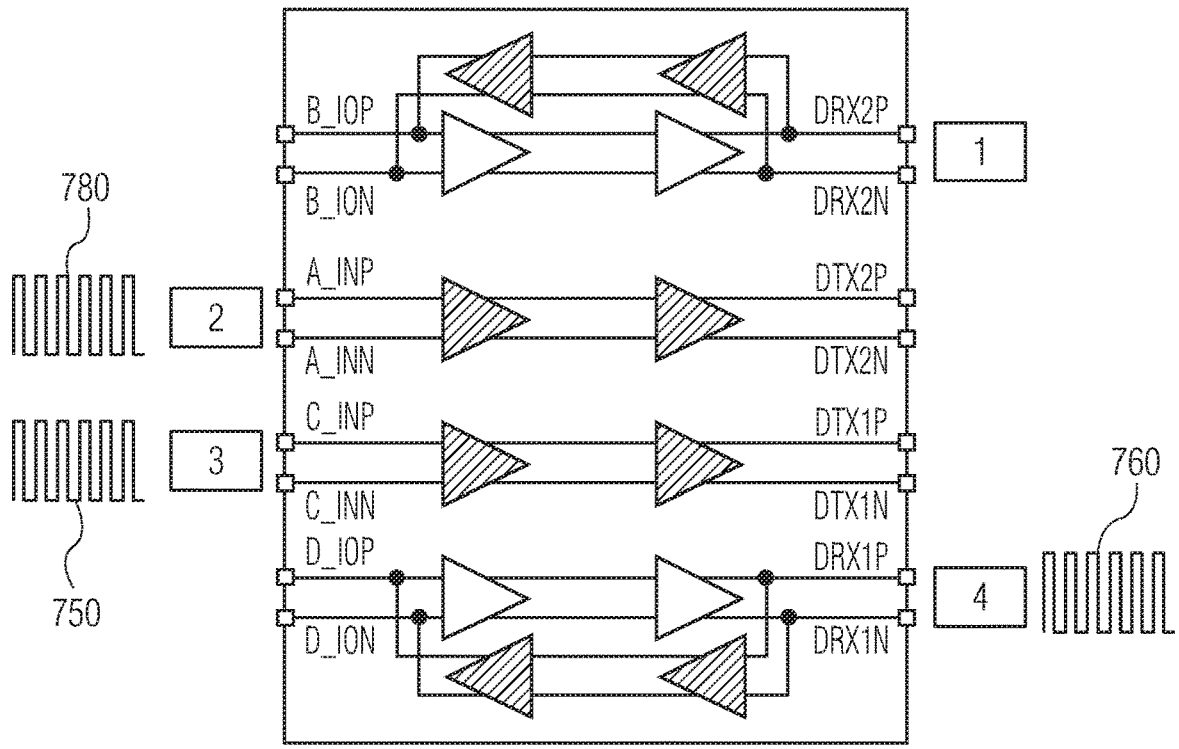

In Mode 2, the state table indicates that the cable is in normal orientation when a line voltage 610 or 620 (termination resistor) is detected on one channel of Lane 1 and no such line voltages (termination resistors) are detected on the channels of Lane 2 during a timer period, as illustrated in FIGS. 6A and 6B. The state table 222 indicates that the cable is in flipped orientation when a line voltage 630 or 640 (termination resistor) is detected on one channel of Lane 2 and no such line voltages (termination resistors) are detected on the channels of Lane 1 during a timer period, as illustrated in FIGS. 6C and 6D. The timer periods for both lanes may be the same or different and may be predetermined periods corresponding, for example, to a span of time for entering a compliance mode of a predetermined cable or communication protocol. The timer period may be determined by timer 226 in controller 220 of FIG. 2A. Mode 2 may be any of the modes previously described, but in this example may be a mode just prior to the compliance mode.

In Mode 3, the state table indicates that the cable is in normal orientation when line voltages 710 and 720 (termination resistors) are detected on both channels of Lane 1. In this case, a line voltage 730 or 740 (termination resistor) is also detected on one channel but not on the other channel of Lane 2, as illustrated FIGS. 7A and 7B. The line voltage (termination resistor) on the channel of Lane 2 may be considered a non-compliant condition of the system, e.g., a spurious signal, noise, or other signal corresponding to an abnormal situation or a non-protocol-complying condition. In spite of this anomalous condition, state table skews towards the normal orientation because of the exchange of (e.g., handshake of) signals on the channels of Lane 1.

The state table indicates that the cable is in a flipped orientation when signals 750 and 760 are detected on both channels of Lane 2. In this case, a signal 770 or 780 is also detected on one channel but not on the other channel of Lane 1, as illustrated FIGS. 7C and 7D. The signal on the channel of Lane 1 may be considered a non-compliant condition of the system, e.g., a spurious signal, noise, or other signal corresponding to an abnormal situation or a non-protocolcomplying condition. In spite of this anomalous condition, state table skews towards the flipped orientation because of the exchange of (e.g., handshake of) signals on the channels of Lane 2.

With four channels and two cable orientations, it is apparent that there is a total of sixteen possible state combinations. The state table 322 only lists ten of the sixteen. The other six state combinations may correspond to situations where the cable orientation may not reliably be determined or whether addition criteria must be taken into consideration to determine the cable orientation. The controller 220 may generate a failure signal when any of the other six state combinations are detected.

In one or more embodiments, the channels or lanes that are not being used in each orientation may be turned off or otherwise rendered inactive by controller 220 in order to save power. In one embodiment, both channels of both lanes may be enabled at the same time, for example, if handshaking signals are detected to be exchanged on both lanes. Also, in one embodiment, a state table different from the one illustrated in FIG. 4 may be used by the controller of the redriver to determine cable orientation.

Figure 8:
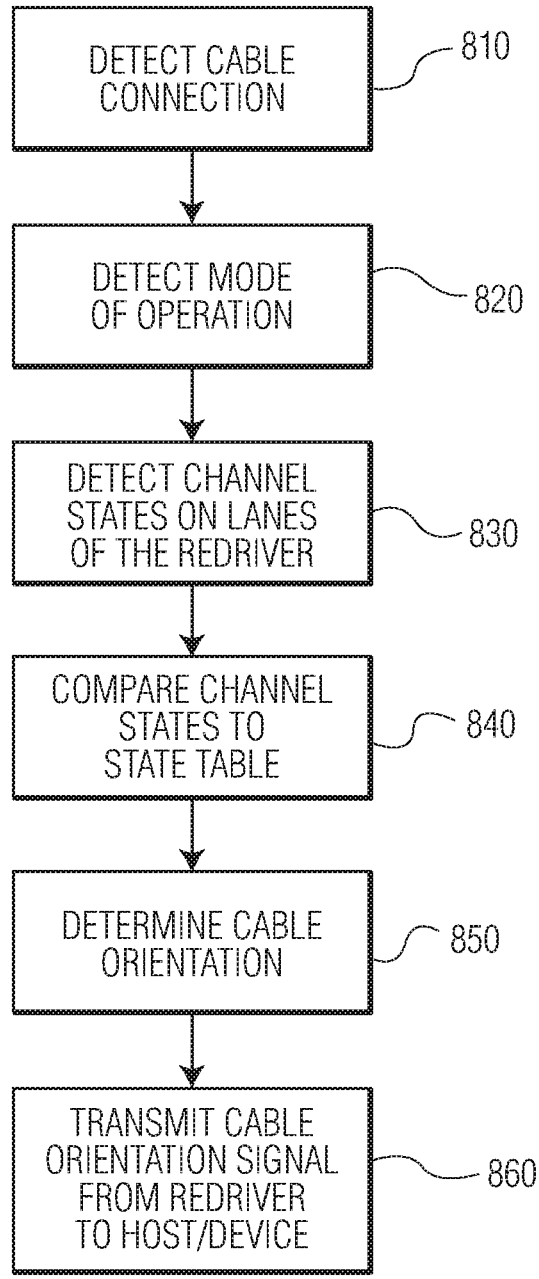
FIG. 8 illustrates an embodiment of a method for detecting orientation of an interface.

FIG. 8 shows an embodiment of a method for determining the orientation of an interface, such as interface 20 described in connection with the aforementioned embodiments. In one embodiment, this method may be performed, for example, based on state table 222 of FIG. 4 relative to features illustrated in FIGS. 1-7. In another embodiment, the method may be performed based on a different state table and/or based on features different from those illustrated in FIGS. 1 to 7. For illustrative purposes, it is assumed that interface 20 is a cable.

In operation 810, connection of the cable to a port of the host system is detected. This may be performed, for example, based on a stimulus applied to one or more pins corresponding to the cable or based on an externally generated signal from the device or host system. Such an externally applied signal may be received, for example, on a predetermined pin of the redriver.

In operation 820, the mode of operation of the host system and/or the connected device is detected. This may be performed, for example, based on a signal received from the controller 16 of the host system or the connected device through one or more pins of the redriver. The mode of operation may be any of the types of modes previously mentioned.

In operation 830, the channel states of the lanes of the redriver are detected. This may be performed, for example, based on the detector(s) previously described with reference to FIG. 2A. The channel signals provide an indication of the channel states, which, in turn, may be used as a basis for determining cable orientation by the redriver.

In operation 840, the channel states are compared in a state table based on the detected mode of operation. The comparison may be performed by a state machine or other logic of the controller 220 of the redriver. As previously indicated, the state table may be the one illustrated in FIG. 4 or another state table.

In operation 850, the orientation of the cable is determined based on the output of the state table. Depending on the operational mode, operation 850 may be performed using the timer 226 to determine, for example, the time period for compliance.

In operation 860, the controller of the redriver may generate and output a cable orientation signal to the host system or device, or both. The host system or device may reconfigure its circuits (e.g., multiplexers, etc.), if applicable, to correspond to the cable orientation.

In accordance with one or more embodiments, a redriver detects the orientation of a cable or other interface coupled to a host system, a device, or both. The redriver may perform this operation, for example, when the host system does not inform the redriver of the cable orientation within a predetermined time period. In this case, the redriver informs the host system of the cable orientation, thereby preventing a system malfunction or error condition. The host system may also turn off power to circuits that are not used to perform signaling based on the detected orientation of the cable. By detecting the cable orientation, the redriver is able to improve operation of the host system while reducing power consumption.

The processors, controllers, detectors, or other signal processing or signal generating features of the embodiments disclosed herein may be implemented in logic which, for example, may include hardware, software, or both. When implemented at least partially in hardware, the processors, controllers, detectors, state machines, state tables, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented at least partially in software, the processors, controllers, detectors, state machines, state tables, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the embodiments may transform the computer, processor, controller, or other signal processing device into a special-purpose processor for performing the methods described herein.

Another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the operations of the embodiments herein.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A host system comprising:
   a plurality of channels configured to be coupled to an interface, wherein each of the plurality of channels has a channel capacitor;
   a plurality of detectors coupled to the plurality of channels, wherein the plurality of detectors are configured to output respective line voltages on the plurality of channels and measure charge rates of the channel capacitors to detect the presence or absence of termination resistors coupled to the respective channel capacitors; and
   a controller configured to determine an orientation of the interface based on states detected by the plurality of detectors based upon the detected presence or absence of the termination resistors coupled to the respective channel capacitors by comparing the measured charge rates of the channel capacitors to charge rates of the channel capacitors when the termination resistors are absent, the controller configured to determine that the interface is in a normal orientation when a first combination of termination resistors is detected for the plurality of channels and to determine that the interface is in a second orientation when a second combination of termination resistors is detected for the plurality of channels, wherein the second orientation of the interface is a flipped version of the normal orientation of the interface.

2. The host system of claim 1, wherein:
   a first lane includes first and second channels of the plurality of channels, and
   a second lane includes third and fourth channels of the plurality of channels, and the host system includes at least two lanes including the first lane and the second lane.

3. The host system of claim 2, wherein a first combination of states includes:
   the first channel and the second channel having a first state; and
   the third channel and the fourth channel having a second state.

4. The host system of claim 3, wherein a second combination of states includes:
   the first channel and the second channel having the second state; and
   the third channel and the fourth channel having the first state.

5. The host system of claim 2, wherein a first combination of states includes:
   the first channel having a first state and the second, third, and fourth channels having a second state after a timer period has expired; or
   the second channel having the first state and the first, third, and fourth channels having the second state after the timer period has expired.

6. The host system of claim 5, wherein the second combination of states includes:
   the third channel having the first state and the first, second, and fourth channels having the second state after the timer period has expired; or
   the fourth channel having the first state and the first, second, and third channels having the second state after the timer period has expired.

7. The host system of claim 2, wherein a first combination of states includes:
   the first, second, and third channels in a first state and the fourth channel in a second state; or
   the first, second, and fourth channels in the first state and the third channel in the second state.

8. The host system of claim 7, wherein the second combination of states includes:
   the first, third, and fourth channels in the first state and the second channel in the second state; or
   the second, third, and fourth channels in the first state and the first channel in the second state.

9. The host system of claim 1, wherein the controller is configured to output a stimulus and the plurality of detectors are configured to detect the states in response to the stimulus.

10. The host system of claim 1, wherein the plurality of detectors are configured to detect the states in response to an externally applied stimulus.

11. The host system of claim 10, wherein the plurality of detectors are configured to detect the states in response to low frequency periodic signals (LFPS) or Loss of Signal (LoS) signals.

12. The host system of claim 1, wherein the controller is configured to output at least one control signal to disable one or more of the plurality of channels not in use for the normal orientation or the second orientation.

13. The host system of claim 1, wherein the controller is configured to output a notification signal to a processor or controller of a host, the notification signal indicating that the interface is in the normal orientation or the second orientation.

14. The host system of claim 1, wherein:
    each of the first and second combinations of states includes a first state and a second state;
    the first state corresponds to detection of a terminal resistor; and
    the second state corresponds to when the terminal resistor is not detected.

15. The host system of claim 1, wherein the interface is a USB-C cable.

16. A method, comprising:
    detecting, by a detector, states of a plurality of channels corresponding to an interface between a host system and a device, wherein each of the plurality of channels has a channel capacitor and detecting the states of the plurality of channels includes:
       outputting respective line voltages on the plurality of channels; and
       measuring charge rates of the channel capacitors to detect the presence or absence of termination resistors coupled to respective channel capacitors;
    determining an orientation of the interface based on states detected by the plurality of detectors based upon the detected presence or absence of the termination resistors coupled to the respective channel capacitors by comparing the measured charge rates of the channel capacitors to charge rates of the channel capacitors when the termination resistors are absent;
    determining that the interface has a normal orientation in response to detecting a first combination of termination resistors for the plurality of channels; and
    determining that the interface has a second orientation in response to detecting a second combination of termination resistors for the plurality of channels, wherein the second orientation of the interface is a flipped version of the normal orientation of the interface.

17. The method of claim 16, wherein:
    each of a first combination of states and the second combination of states includes a first state and a second state;

the first state corresponds to detection of a terminal resistor; and the second state corresponds to when the terminal resistor is not detected.

18. The host system of claim 1, comprising:

a state table storing information relating a first combination of channel states to a normal orientation of the interface and a second combination of channel states to a second orientation of the interface.

19. The host system of claim 18, wherein the controller is configured to output a notification signal to a processor or controller of the host system indicating that the interface is in the normal orientation or the second orientation.

* * * * *